(12) United States Patent
Lee et al.

(10) Patent No.: US 6,866,955 B2
(45) Date of Patent: Mar. 15, 2005

(54) COOLING SYSTEM FOR A FUEL CELL STACK

(75) Inventors: James H. Lee, Rochester, NY (US); Glenn W. Skala, Churchville, NY (US)

(73) Assignee: General Motors Corporation, Detroit, MI (US)

( * ) Notice: Subject to any disclaimer, the term of this patent is extended or adjusted under 35 U.S.C. 154(b) by 121 days.

(21) Appl. No.: 10/152,858

(22) Filed: May 22, 2002

(65) Prior Publication Data

US 2003/0219635 A1 Nov. 27, 2003

(51) Int. Cl.$^7$ .................................................. H01M 8/04
(52) U.S. Cl. .......................... 429/26; 429/24; 429/25; 429/34; 429/38; 429/39
(58) Field of Search ........................... 429/26, 25, 30, 429/38, 39, 20, 13

(56) References Cited

U.S. PATENT DOCUMENTS

| | | | | |
|---|---|---|---|---|
| 4,454,720 A | * | 6/1984 | Leibowitz | .................. 60/648 |
| 5,663,113 A | | 9/1997 | Midorikawa et al. | |
| 5,736,269 A | * | 4/1998 | Okamoto et al. | .............. 429/32 |
| 5,766,624 A | | 6/1998 | Janoff et al. | |
| 5,769,909 A | | 6/1998 | Bonk et al. | |
| 6,306,354 B1 | * | 10/2001 | Szydlowski et al. | ......... 422/200 |
| 6,355,368 B1 | * | 3/2002 | Kralick | ........................ 429/26 |
| 6,358,642 B1 | | 3/2002 | Griffith et al. | |
| 6,360,835 B1 | | 3/2002 | Skala | |

OTHER PUBLICATIONS

Notification of Transmittal Of The International Search Report Or The Declaration, dated Sep. 2, 2003.
3M Novec Engineered Fluid HFE–8401HT, "A New Heat Transfer Fluid with Unique Heat Transfer Properties," pp. 1–7 (1999).

* cited by examiner

Primary Examiner—Patrick Ryan
Assistant Examiner—Angela J. Martin
(74) Attorney, Agent, or Firm—Harness, Dickey & Pierce, P.L.C.

(57) ABSTRACT

A fuel cell cooling system is provided with a coolant pump for pumping fluid through coolant flow field passages in a fuel cell stack. A pressure control mechanism is provided for maintaining a pressure level within the fuel cell stack for causing a phase change of the coolant within the stack. Allowing the coolant to change phase to a gas inside the stack reduces the amount of coolant needed to cool the fuel cell stack and thereby reduces the energy needed to pump the coolant through the fuel cell stack.

12 Claims, 3 Drawing Sheets

COOLING SYSTEM FOR A FUEL CELL STACK

FIELD OF THE INVENTION

This invention relates generally to fuel cells and more particularly to a cooling system for a fuel cell stack that allows a liquid coolant to change phase inside the fuel cell stack in order to reduce the pumping power required to circulate the coolant and provide more uniform temperatures within each cell of a fuel cell stack.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. The oxygen can be either a pure form ($O_2$) or air (a mixture of $O_2$ and N2). PEM fuel cells include a membrane electrode assembly (MEA) comprising a thin, proton transmissive, non-electrically conductive, gas impermeable, solid polymer electrolyte membrane having the anode catalyst on one face and the cathode catalyst on the opposite face. The MEA is sandwiched between a pair of non-porous, electrically conductive elements or plates which (1) serve as current collectors for the anode and cathode, and (2) contain appropriate channels and/or openings formed therein for distributing the fuel cell's gaseous reactants over the surfaces of the respective anode and cathode catalysts.

The term "fuel cell" is typically used to refer to either a single cell or a plurality of cells (stack) depending on the context. A plurality of individual cells are typically bundled together to form a fuel cell stack and are commonly arranged in electrical series. Each cell within the stack includes the membrane electrode assembly (MEA) described earlier, and each such MEA provides its increment of voltage. By way of example, some typical arrangements for multiple cells in a stack are shown and described in U.S. Pat. No. 5,663,113.

The electrically conductive plates sandwiching the MEAs may contain an array of grooves in the faces thereof that define a reactant flow field for distributing the fuel cell's gaseous reactants (i.e., hydrogen and oxygen in the form of air) over the surfaces of the respective cathode and anode. These reactant flow fields generally include a plurality of lands that define a plurality of flow channels therebetween through which the gaseous reactants flow from a supply header at one end of the flow channels to an exhaust header at the opposite end of the flow channels.

In a fuel cell stack, a plurality of cells are stacked together in electrical series while being separated by a gas impermeable, electrically conductive bipolar plate. In some instances, the bipolar plate is an assembly formed by securing a pair of thin metal sheets having reactant flow fields formed on their external, face surfaces. Typically, an internal coolant flow field is provided between the metal plates of the bipolar plate assembly. Various examples of a bipolar plate assembly of the type used in PEM fuel cells are shown and described in commonly-owned U.S. Pat. No. 5,766,624.

Fuel cell stacks produce electrical energy efficiently and reliably. However, as they produce electrical energy, losses in the electrochemical reactions and electrical resistance in the components that make up the stack produce waste thermal energy (heat) that must be removed for the stack to maintain a constant optimal temperature. Typically, the cooling system associated with a fuel cell stack includes a circulation pump for circulating a single-phase liquid coolant through the fuel cell stack to a heat exchanger where the waste thermal energy (i.e., heat) is transferred to the environment. The two most common coolants used are de-ionized water and a mixture of ethylene glycol and de-ionized water. The thermal properties of these typical liquid coolants require that a relatively large volume be circulated through the system to reject sufficient waste heat in order to maintain a constant stack operating temperature, particularly under maximum power conditions. Large amounts of electrical energy are required to circulate the coolant, which reduces the overall efficiency of the fuel cell power system. To this end, it is desirable to reduce the amount of coolant needed to cool a fuel cell stack and thereby reduce the amount of pumping power required.

SUMMARY OF THE INVENTION

Accordingly, the present invention provides a cooling system for channeling coolant through a fuel cell. The cooling system includes a plate having a first side defining a reactant flow field and a second side defining a coolant flow field. The coolant flow field has inlet and outlet passages with a source of liquid coolant connected to the inlet passage. A pressure control mechanism is provided for maintaining a pressure at the outlet passage of the coolant flow field at a pressure that causes the liquid coolant to boil within the coolant flow field. Allowing the coolant to change phase to a gas inside the stack reduces the amount of coolant needed to cool the fuel cell stack. The energy needed to change a liquid to a gas is much greater than the heat carrying capacity of the liquid. As a result, the amount of coolant needed to cool a stack, and thereby the amount of coolant that must be pumped through the system is reduced as is the parasitic load on the system.

The present invention enables improved temperature uniformity and increased radiator/condenser efficiency.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
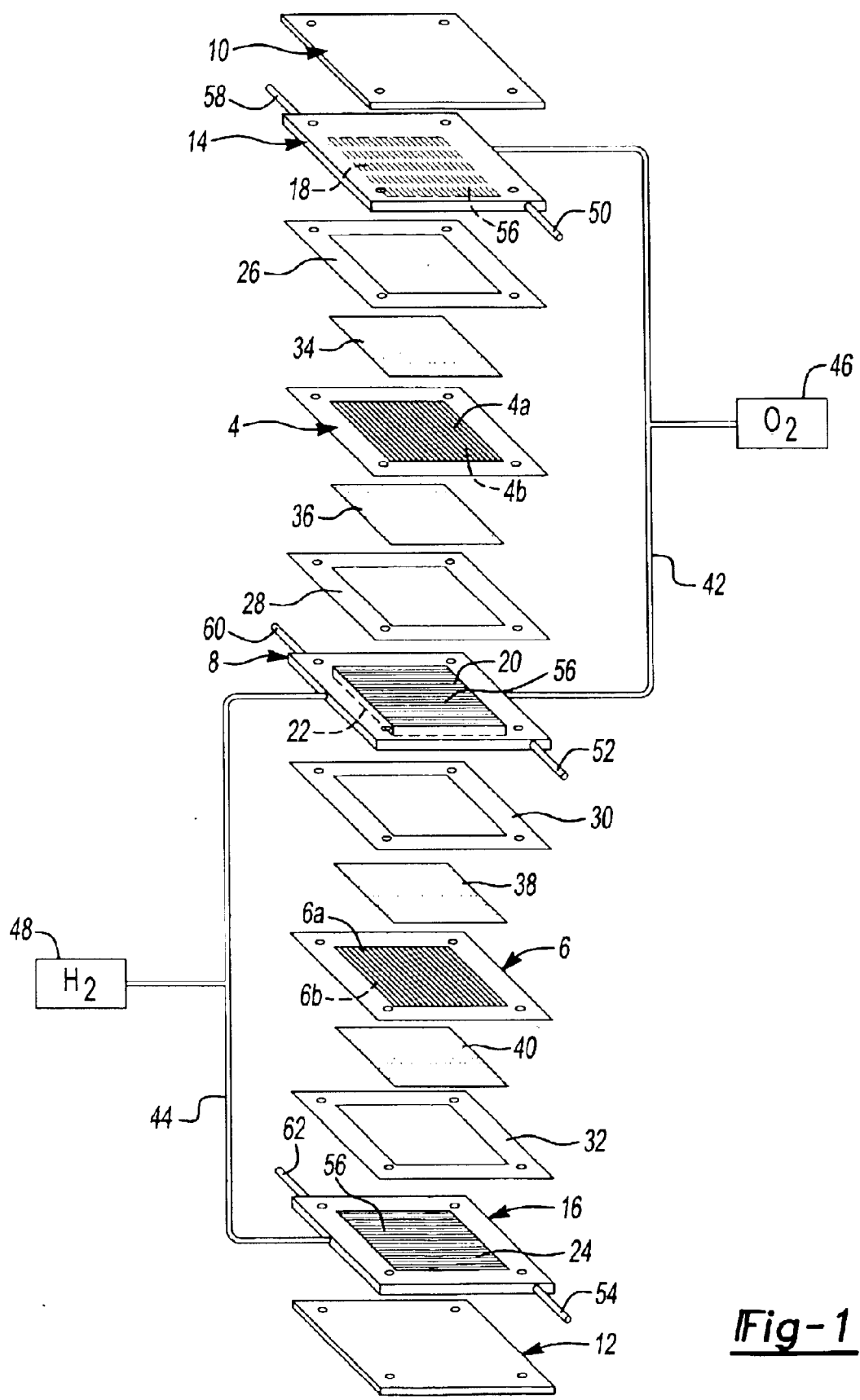
FIG. 1 is an exploded isometric view of a PEM fuel stack.

Before further describing the invention, it is useful to understand an exemplary fuel cell system within which the invention operates. Specifically, FIG. 1 schematically depicts a PEM fuel cell stack having a pair of membrane-electrode assemblies (MEAs) 4 and 6 separated from each other by a non-porous, electrically-conductive, liquid-cooled bipolar plate assembly 8. Each MEA 4 and 6 has a corresponding cathode face 4a, 6a and an anode face 4b and 6b. MEAs 4 and 6 and bipolar plate assembly 8 are stacked together between non-porous, electrically-conductive, liquid-cooled monopolar end plate assembly 14 and 16. Steel clamping plates 10 and 12 are provided for enclosing the exemplary fuel cell stack. Connectors (not shown) are attached to clamping plates 10 and 12 to provide positive and negative terminals for the fuel cell stack. Bipolar plate assembly 8 and end plate assemblies 14 and 16 include corresponding flow fields 20, 22, 18 and 24, each having a plurality of flow channels formed in the faces thereof for distributing fuel and oxidant gases (i.e., $H_2$ and $O_2$) to the reactive faces of MEAs 4 and 6. Nonconductive gaskets or seals 26, 28, 30, and 32 provide a seal and electrical insulation between the several plates of the fuel cell stack.

With continued reference to FIG. 1, porous, gas permeable, electrically conductive sheets 34, 36, 38 and 40 are shown to be pressed up against the electrode faces of MEAs 4 and 6 and serve as primary current collectors for the electrodes. Primary current collectors 34, 36, 38 and 40 also provide mechanical supports for MEAs 4 and 6, especially at locations where the MEAs are otherwise unsupported in the flow fields.

End plates 14 and 16 press up against primary current collector 34 on cathode face 4a of MEA 4 and primary current collector 40 on anode face 6b of MEA 6 while bipolar plate assembly 8 presses up against primary current collector 36 on anode face 4b of MEA 4 and against primary current collector 38 on cathode face 6a of MEA 6. An oxidant gas, such as oxygen or air, is supplied to the cathode side of the fuel cell stack from a storage tank 46 via appropriate supply plumbing 42. Similarly, a fuel, such as hydrogen, is supplied to the anode side of the fuel cell from a storage tank 48 via appropriate supply plumbing 44. In a preferred embodiment, oxygen tank 46 may be eliminated, such that ambient air is supplied to the cathode side from the environment. Likewise, hydrogen tank 48 may be eliminated and hydrogen supplied to the anode side from a reformer which catalytically generates hydrogen from methanol or a liquid hydrocarbon (e.g., gasoline). While not shown, exhaust plumbing for both the $H_2$ and $O_2$/air sides of MEAs 4 and 6 is also provided for removing $H_2$—depleted anode gas from the anode reactant flow field and $O_2$—depleted cathode gas from the cathode reactant flow field.

Coolant supply plumbing 50, 52, and 54 is provided for supplying a liquid coolant from an inlet header (not shown) of the fuel cell stack to the coolant flow fields of bipolar plate assembly 8 and end plates 14 and 16. The coolant flow fields of the bipolar plate assembly 8 and end plates 14 and 16 include long narrow channels 56 defining coolant passages within the plates 8, 14, and 16. As shown in FIG. 1, coolant exhaust plumbing 58, 60, and 62 is provided for exhausting the heated coolant discharged from bipolar plate assembly 8 and end plates 14 and 16 of the fuel cell stack.

Figure 2:
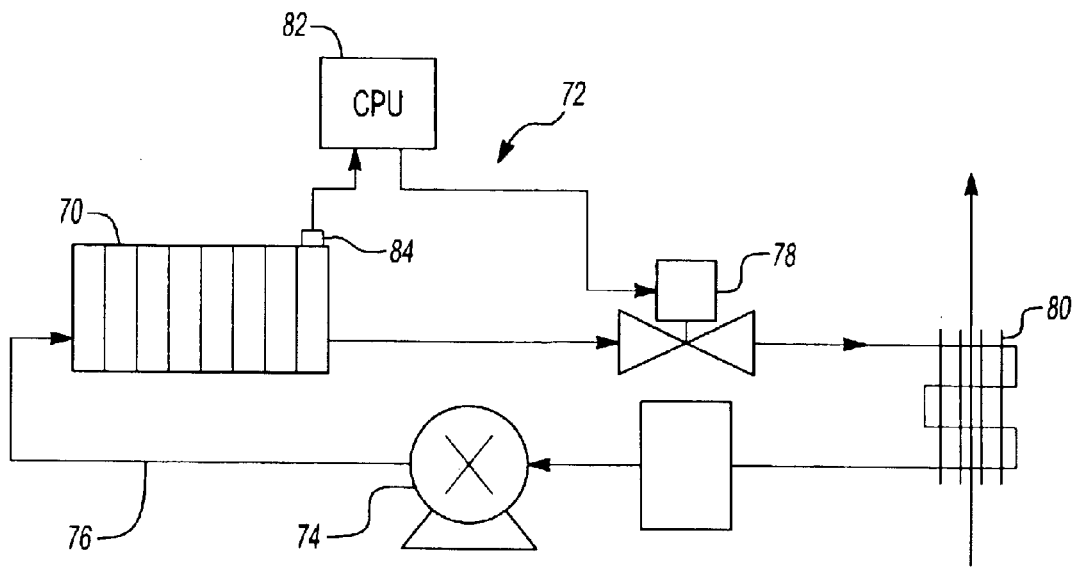
FIG. 2 is a schematic view of the cooling system according to the principles of the present invention for use with the PEM fuel cell stack shown in FIG. 1.

FIG. 2 is a schematic diagram of a phase-change cooling system according to the principles of the present invention. As shown in FIG. 2, a fuel cell stack 70, such as the one shown in FIG. 1, is provided. A cooling system 72 includes a pump 74 which provides liquid coolant to the fuel cell stack 70 through coolant passage 76. A pressure control valve 78 is provided at the exhaust end of the fuel cell stack 70 and a radiator/condenser 80 is provided downstream of the pressure control valve 78 for cooling the coolant (in liquid and vapor mixture form) and condensing it back to a liquid form for return to the pump 74. An accumulator 86 is provided upstream of the pump 74 to remove bubbles from the coolant fluid before the pump 74. The accumulator 86 may optionally be provided with a dehydrator functionality which would remove water if the chosen fluid reacts adversely to water (i.e., the needed properties change when mixed with water). A controller 82 is provided for controlling the pressure control valve 78 in response to a temperature of the stack 70 as determined by a temperature sensor 84. The pressure is controlled such that for the measured temperature level, a pressure is maintained that causes the coolant to boil within the stack. The control 82 may include a processor (CPU) or dedicated circuitry for carrying out this function.

Figure 4:
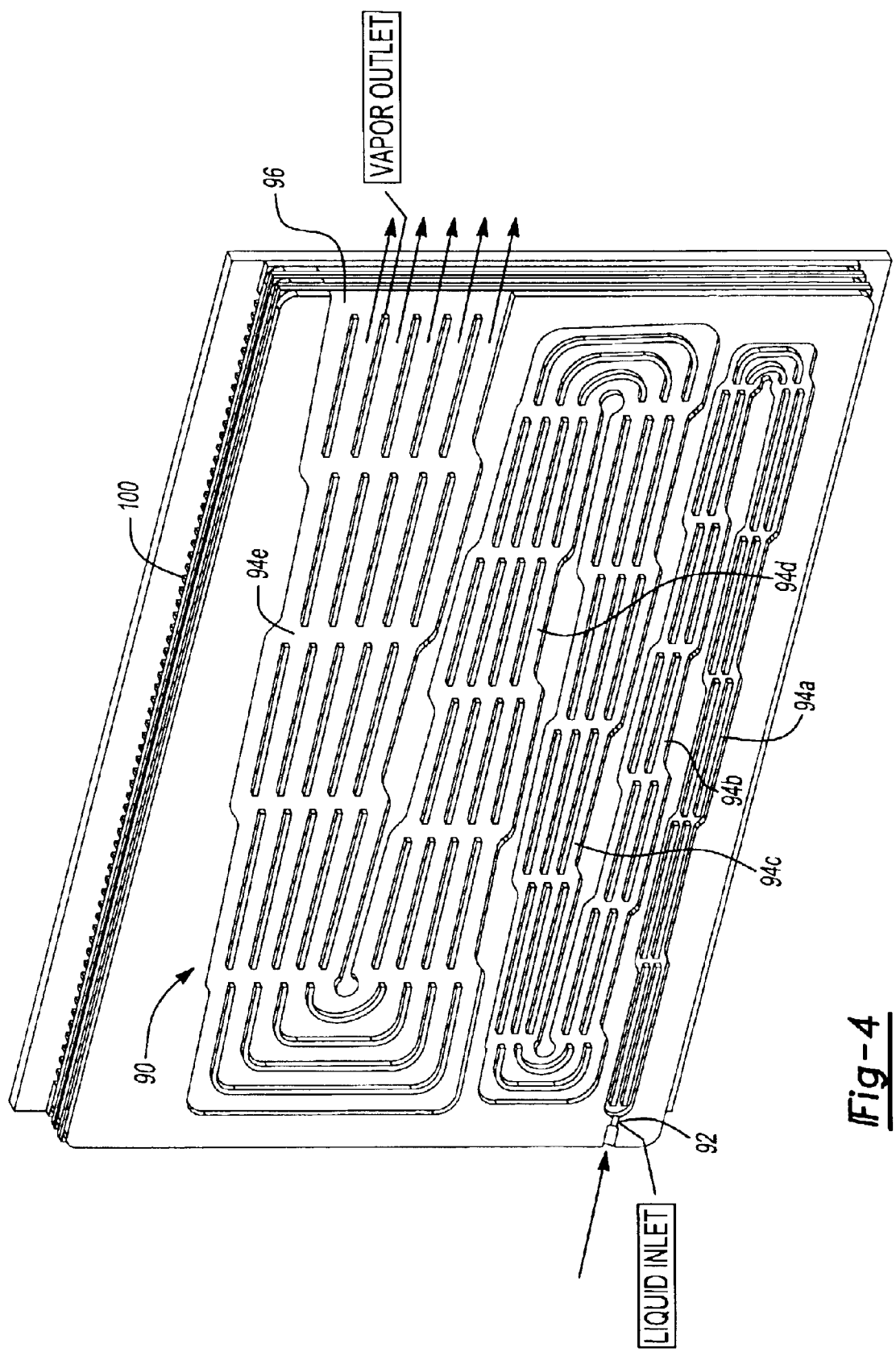
FIG. 4 is a perspective view of the coolant channels within the stack.

Liquid coolant exits the coolant pump 74 at an elevated pressure and enters the fuel cell stack 70. While in the stack, a fraction of the coolant boils at a temperature determined by the pressure of the coolant. As best illustrated in FIG. 4, the coolant channels 90 within the stack are designed to accommodate the expansion of some of the liquid to a gaseous state minimizing the increased pressure drop brought on by the increase in volumetric flow of two phase fluid. The coolant channels 90 include a narrow liquid inlet 92 and a series of alternating direction serpentine channel segments 94a–e that progressively widen from the inlet 92 to the outlet 96. The widening channel design ensures somewhat uniform coolant distribution which in turn avoids regions where the coolant boils away completely causing hot spots. The coolant emerges from the stack as a two-phase mixture of liquid and vapor coolant. The mixture enters the pressure control valve 78 that is used to control the system pressure. Next, the coolant enters the radiator/condenser 80 where the coolant changes back to a liquid. Upon exiting the radiator/condenser, the coolant returns to the coolant pump 74.

The present invention reduces the amount of coolant needed to cool a fuel cell stack by allowing a liquid coolant to change phase to a gas inside the stack. The energy needed to change a liquid to a gas is much greater than the heat carrying capacity of the liquid. As a result, the amount of coolant needed to cool a stack, and thereby the amount of coolant that must be pumped through the system, is reduced. Thus, the parasitic load on the system that is typically required to pump the large amounts of coolant is also reduced. Test results have shown that a mixture of 40 percent of methanol in water which was allowed to change phase in a fuel cell stack resulted in a pumping power reduction from 1,000 watts to 200 watts in an 85 kilowatt fuel cell power system. In other words, one-fifth of the pumping power was required when the pressure of the coolant was regulated such that some of the coolant was allowed to change phase within the fuel cell stack according to the principles of the present invention.

Figure 3:
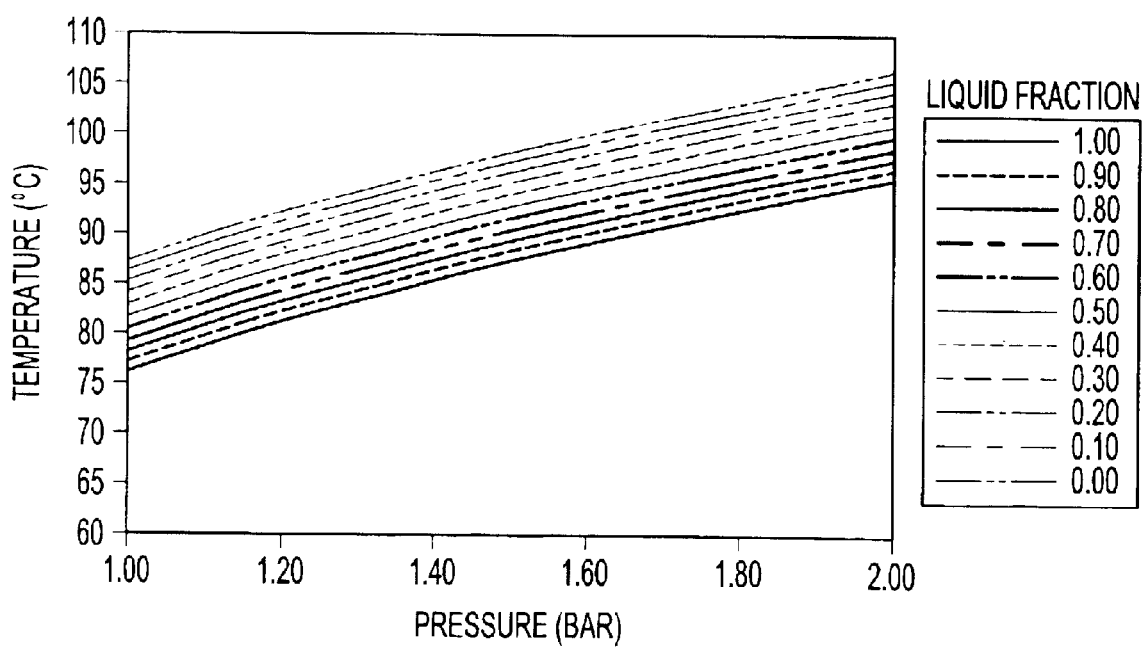
FIG. 3 graphically illustrates the boiling curve relationship between temperature and pressure for a water/methanol coolant mixture.

Using a cooling system where the coolant boils has benefits in addition to reduced system parasitic losses. These benefits include improved temperature control reduced, improved temperature uniformity, and increased radiator/condenser efficiency. When a liquid changes to a gas; i.e., boils, it does so at a single temperature. The local pressure of the liquid determines the temperature at which a liquid boils. Therefore, controlling the pressure control valve to maintain a predetermined pressure drop in a stack, specifies the temperature gradient, and changing the pressure of the cooling loop changes the stack temperature. Increasing the pressure will increase the stack temperature while lowering the pressure reduces the stack temperature, all the while the temperature gradient across the stack remains the same. The relationship between pressure and boiling temperature for a water-methanol mixture is shown in FIG. 3. It should be understood that other liquids with similar boiling characteristics could be used.

Using a coolant that changes phase has the added benefit that it increases the efficiency of the radiator/condenser used to reject the waste thermal-energy to the environment. The increase in efficiency is due to the constant temperature relationship of condensing fluids. The constant temperature in the radiator/condenser means the temperature difference between the coolant and the air used to remove the heat is maintained instead of reduced, as it is in single phase heat transfer. The temperature difference between the coolant and the air is one of the major factors determining radiator/condenser efficiency.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of cooling a fuel cell stack having coolant passages therein, comprising:

pumping a coolant fluid through the coolant passages of said fuel cell stack, said coolant fluid having a predetermined boiling temperature within a predetermined pressure range;

maintaining a pressure of said coolant passages of said fuel cell stack within said predetermined pressure range so as to cause said coolant fluid to boil within said coolant passages of said fuel cell stack; and cooling said coolant fluid.

2. The method of claim 1, wherein said coolant fluid includes water.

3. The method of claim 1, wherein said coolant fluid includes methanol.

4. The method of claim 1, wherein said coolant fluid includes a methanol-water mixture.

5. The method of claim 1, wherein said coolant passages progressively widen from an inlet end to an outlet end to accommodate gas evolved as said fluid boils.

6. A fuel cell, comprising:

a bipolar plate assembly having an internal coolant flow field including at least one coolant passage which is wider at an outlet of said passage as compared to an inlet of said passage;

a source of liquid coolant delivered to said internal coolant flow field; and a pressure control mechanism for controlling a pressure of said internal flow field at a predetermined pressure level to cause coolant in said internal coolant flow field to boil at operating temperature of the fuel cell.

7. The fuel cell of claim 6, wherein said internal coolant flow field includes a plurality of elongated said coolant passages.

8. The fuel cell of claim 6, further comprising a condenser for cooling coolant received from said pressure control mechanism.

9. The fuel cell of claim 6, wherein said source of liquid coolant includes a pump.

10. The fuel cell of claim 6, wherein said internal coolant flow field includes a plurality of said coolant passages that progressively widen from said inlet to said outlet to accommodate liquid-to-gas expansion.

11. A method of cooling a fuel cell stack having coolant passages therein, comprising the steps of:

pumping a coolant fluid through the coolant passages, said coolant fluid having a predetermined boiling temperature within a predetermined pressure range;

maintaining a pressure of said coolant passage within said predetermined pressure range so as to cause said coolant fluid to boil within said coolant passages; and cooling said coolant fluid, wherein said coolant passages progressively widen from an inlet end to an outlet end to accommodate fluid-to-gas expansion.

12. A fuel cell, comprising:

a bipolar plate assembly having an internal coolant flow field having an inlet and an outlet passage;

a source of liquid coolant delivered to said inlet passage of said internal coolant flow field; and a pressure control mechanism for controlling a pressure of said outlet passage at a predetermined pressure level to cause coolant in said internal coolant flow field to boil at operating temperature of the fuel cell, wherein said internal coolant flow field includes a plurality of coolant passages that progressively widen from an inlet to an outlet end to accommodate liquid-to-gas expansion.

* * * * *